United States Patent [19]
Bozon et al.

[11] 4,294,726
[45] Oct. 13, 1981

[54] CATALYST FOR THE PURIFICATION OF EXHAUST GASES OF INTERNAL COMBUSTION ENGINES

[75] Inventors: Alfred Bozon, Erlensee; Edgar Koberstein, Alzenau; Hans-Dieter Pletka, Freigericht; Herbert Völker, Hanau; Eduard Lakatos, Rheinfelden-Eichsel, all of Fed. Rep. of Germany

[73] Assignee: Deutsche Gold-und Silber-Scheideanstalt vormals Roessler, Frankfurt, Fed. Rep. of Germany

[21] Appl. No.: 120,172

[22] Filed: Feb. 11, 1980

[30] Foreign Application Priority Data

Feb. 23, 1979 [DE] Fed. Rep. of Germany ....... 2907106

[51] Int. Cl.$^3$ ..................... B01J 21/06; B01J 23/10; B01J 23/89
[52] U.S. Cl. .................................. 252/462; 423/213.5
[58] Field of Search ...................... 252/462; 423/213.5

[56] References Cited

U.S. PATENT DOCUMENTS 4,006,103 2/1977 Meguerian et al. ............. 252/466 B
4,048,098 9/1977 Koberstein et al. ............ 252/462 X
4,171,288 10/1979 Keith et al. ........................ 252/462

Primary Examiner—W. J. Shine
Attorney, Agent, or Firm—Beveridge, DeGrandi & Kline

[57] ABSTRACT

A three-way catalyst is described for the purification of automobile exhaust gases formed of an active substance of platinum and rhodium and possibly base metal(s) at a certain weight ratio between the two noble metals and at a certain atomic ratio between the noble and the base metal, which are precipitated onto active aluminum oxide containing certain quantities of $CeO_2$, $ZrO_2$ and $Fe_2O_3$, and whereby the catalyst is obtained by impregnating active aluminum oxide, possibly stabilized with alkaline earth metal, with a solution of cerium, zirconium and iron salt which is thereupon calcined in air at 500°–700° C. and then treated after application of an impregnation of salts of the active substance components in a gas current containing hydrogen at temperatures below 650° C.

27 Claims, 6 Drawing Figures

ND EXHAUST GASES OF INTERNAL COMBUSTION
ENGINES

INTRODUCTION

The invention relates to catalysts for simultaneous oxidation of carbon monoxide and hydrocarbons and the reduction of nitric oxides in exhaust gases of internal combustion engines, a process for their production as well as the use of these catalysts.

BACKGROUND OF THE INVENTION

So-called three-way catalysts have the characteristics of converting the harmful substances CO, HC and $NO_x$ in a determined range of the composition of the exhaust gas. At the present time, they are being tested in motor vehicles in connection with controlled carburetor or an injection installation ("closed loop") for the purification of exhaust gas. By means of an oxygen-measuring probe, the so-called $\lambda$-probe, the $O_2$ content in the exhaust gas is determined. The probe produces a voltage between 200 and 800 mV, depending on the $O_2$ partial pressure in the exhaust gas. The voltage is amplified electronically and by way of a controller, it controls the formation of the mixture of the injection system or of a carburetor. The control is accomplished such that the composition of the exhaust gas mixture always makes possible the optimal simultaneous conversion of CO, HC and $NO_x$ at the most favorable operating point of the catalyst in the narrowest possible band width. The following assumptions are necessary for an effective operation of the controlling system and the catalyst:

1. The composition of the mixture should be as stoichiometric as possible, i.e., in the case of a complete conversion of the exhaust gas components, only the reaction products $CO_2$, $H_2O$ and $N_2$ would remain ($\lambda = 1$);

2. The optimal operating point of the catalyst should lie as close as possible to $\lambda = 1$ or beyond that in the lean exhaust gas range;

3. The characteristic line of the $\lambda$-probe should coincide as much as possible with the optimal operating point of the catalyst at the most stable control point.

In the case of known three-way catalysts and the $\lambda$-probes being used serially at the present, the optimal operating and control points clearly deviate from each other. Thus, for example, the range in which the highest CO and $NO_x$ conversion is achieved in dynamic operation lies between $\lambda = 0.985$ 0.990, corresponding to the air/fuel ratio A/F = 14.48-14.55, while the $\lambda$-probe has its optimal operating point at 350 mV, corresponding to $\lambda = 1.001$.

Thus, there is a difference between the optimal operating points of the catalyst and the $\lambda$-probe of the $\Delta\lambda = 0.016$-$0.011$, a disadvantage which must be compensated by the control. With an electronic control, this will be possible only to a limited degree by way of the regulating time constant, which leads to the fact that the catalyst is acted upon with an exhaust gas which has a different composition as would be required for the maximum conversion of all harmful substances. Continuing progressive legislation in the United States which requires a reduction of the $NO_x$ emission beginning with 1982 to 0.42 g/M therefore requires a catalyst, the optimal operating point of which lies closer to $\lambda = 1$.

SUMMARY OF THE INVENTION

It has now been found surprisingly that platinum and rhodium and possibly certain base metal containing active phases in combination with a carrier material of aluminum oxide of the transition series which contains additions of oxides of the elements cerium, zirconium and iron in determined quantitative ratios, will produce the desired shifting of the operating point whenever carrier material and active phase are produced in certain manner. By aluminum oxide of the transition series, one must understand an active, that is to say catalysis promoting aluminum oxide, which may contain the following crystallographically determinable phases: $\gamma$-, $\eta$-, $\delta$-, $\theta$- or $\Theta$-, $\beta$- and $\kappa$- $Al_2O_3$.

DESCRIPTION OF THE INVENTION

The catalyst of the invention is characterized by (a) 0.03-3% by weight of a platinum, rhodium and optionally one or more of the elements aluminum, titanium, tin, chromium, manganese, cobalt and nickel containing active phase with a weight ratio between platinum and rhodium of 2:1-20:1 and optionally with an atomic ratio between the platinum group metals and the base metals of 1:6-2:1, preferably 1:4-1:1;

(b) 5-15, preferably 10% by weight of a mixture of $CeO_2$ and $ZrO_2$, whereby these oxides are at a weight ratio of 20-80:80-20;

(c) 1-10, preferably 2-6% by weight of $Fe_2O_3$ as well as (d) a residual quantity up to 100% by weight of aluminum oxide of the transition series. and is obtained by the fact that a carrier material of $Al_2O_3$ of the transition series, optionally lattice stabilized with alkaline earth metal, is impregnated with an aqueous solution of cerium-, zirconium- and iron salts or mixed with their oxides, is then tempered for 30-180 min. in the air at 500°-700° C., the carrier is thereupon impregnated with an aqueous solution of a salt of the platinum, rhodium and optionally the base metal component(s), is then dried and subsequently treated at temperatures of 250°-650° C., preferably 450°-550° C. in a gas current containing hydrogen. Among the measures for the production of this platinum/rhodium catalyst, the conditions for tempering the carrier material for the concluding reduction treatment of the entire system, are especially essential. Gamma-aluminum oxide, lattice stabilized with calcium, is preferred as a substance for the carrier material.

The active phase present on the catalyst exists in concentrations known per se; catalysts with 0.03-3% by weight are included for all fields of application of exhaust gas purification.

Beside the two platinum group metals, the active phase may yet contain one other or several of the above mentioned base metals. At the same time, it is preferred that the base metal be aluminum or nickel, whereby between the platinum group metals and the aluminum, a weight ratio of 3:1-1:1 exists, and between the platinum group metals and the nickel a weight ratio of 4:1-2:1 exists.

The carrier catalyst according to the invention may be present in the form of a coating consisting of the components (a) –(d) on a honeycomb-shaped structural reinforcer of ceramic or metal in an amount of 5-30% by weight, related to the weight of this structural reinforcer. Suitable ceramic honeycomb may consist of $\alpha$-$Al_2O_3$, mullite, zirconium, zirconium mullite, cordierite, barium titanate, porcelain, thorium oxide, steatite, magnesium oxide, boron carbide or silicon carbide. Metal honeycombs may be formed from plain high temperature resistant steel sheets and from corrugated steel sheets disposed alternately on top of one another. They may also consist of plain and corrugated layers of high temperature resistant and scale resistant steel disposed alternately on top of one another, whereby one layer of corrugated sheet metal alternates with a layer of plain sieve netting, or a layer of plain sheet metal alternates with a layer of corrugated sieve netting, or a layer of corrugated sieve netting alternates with a layer of plain sieve netting (screen cloth). As the metal, alloys with the main components of iron, chromium, aluminum and optionally also cerium or yttrium may be used, whereby the metal for the creation of a surface favorable for anchorage, is heated in an oxygen containing gas under conditions of temperature and time such that a surface layer of aluminum oxide develops from the aluminum contained in the alloy. However, the metal may also be a simple carbon steel or simple cast iron, which is coated with an aluminum/iron-diffusion layer obtained by tempering for at least 1 minute aluminum coated iron or steel at temperatures between 600° and 1200° C.

Although the use of a structural reinforcer is preferred, the carrier material may also be present as a molded bulk material. In some cases, it may be effective to use the catalyst in the form of a coating consisting of the components (a)-(d) on structurally reinforcing bulk material bodies from the above-mentioned ceramic or metal materials.

A further object of the invention is a process for the production of the described catalyst. It resides in a process wherein a carrier material of $Al_2O_3$ of the transition series, optionally lattice stabilized with alkaline earth metal, is impregnated with an aqueous solution of cerium-, zirconium- and iron salts or mixed with their oxides, is then tempered for 30–180 minutes on the air at 500°–700° C., the carrier is thereupon impregnated with an aqueous solution of a salt of platinum, rhodium and possibly one or more of the elements aluminum, titanium, tin, chromium, manganese, cobalt and nickel; is then dried and subsequently treated at temperatures of 250°–650° C., preferably 450°–550° C. in a gas steam containing hydrogen. Catalysis promoting aluminum oxide, lattice stabilized with calcium, is preferred as a carrier material. Maintaining the temperature ranges provided for the tempering of the impregnated carrier material is important. The effect of the final reduction treatment, which must take place in the above-mentioned temperature range extends to all elements inserted into the carrier by the impregnation measures, insofar as these elements are present in a reducible combination. Beside pure hydrogen and CO, the following gas mixtures come into consideration as a hydrogen containing gas: a mix of hydrogen and nitrogen, hydrogen and noble gases, hydrogen and $CO_2$, hydrogen with a gas which is inert in relation to the catalyst. The mixing ratios may be arbitrary.

A preferred active phase contains aluminum as the base metal. Nickel too, may be advantageous. In the case of the use of aluminum, platinum group metals and aluminum at a weight ratio of 3:1–1:1, are used. In the case of the use of nickel, platinum group metals and nickel are used at a weight ratio of 4:1–2:1.

In order to stabilize the surface of the carrier material, one variation of the process according to the invention prescribes tempering the carrier material prior to the impregnation with cerium-, zirconium- and iron salts or prior to the addition of oxides of these elements at 900° C. The carrier material may be impregnated prior to tempering with the aqueous solution of an alkaline earth metal salt. Calcium, strontium or also magnesium are preferred as a lattice stabilizer, because these, as compared to the likewise usable element barium, are nontoxic.

In order that the temperature conditions, essential for the improved three-way characteristics of the catalyst according to the invention, for the carrier material impregnated with cerium-, zirconium- and iron salts of at most 700° C., may be adhered to, the cerium salt preferably is used in the form of cerium nitrate, cerium acetate, ammonium cerium nitrate, cerium carbonate, cerium oxalate, cerium chloride or cerium citrate; as zirconium salt preferably one uses zirconium carbonate, zirconium acetate, zirconium nitrate, ammonium zirconium carbonate, zirconium oxychloride, zirconium formiate or zirconium propionate; and as an iron salt, one uses iron formiate, iron nitrate, iron oxalate, iron thiocyanate, iron (II)-acetate, iron acetyl acetonate or ammonium iron citrate.

Whenever one wants to attach the carrier material on a honeycomb-shaped structural reinforcer of ceramic or metal or on structurally reinforcing bulk material bodies, then this is best accomplished by bringing this structural reinforcer into contact with an aqueous dispersion containing in solution optionally an alkaline earth metal salt, such as calcium nitrate, by removal of exess dispersion and subsequent drying, whereby these processes are optionally executed several times as well as by calcining at temperatures of 900° C. This is then followed by the introduction of the cerium/zirconium/iron components and by developing the active phase corresponding to the described measures according to the invention.

An embodiment of the process according to the invention, simplifying the process and therefore a favorable one, provides that by bringing the structural reinforcer into contact with an aqueous dispersion containing the dispersion of aluminum oxide of the transition series, and a solution of the salts of cerium, zirconium and iron or containing the oxides of these elements, removing excess dispersion and drying; whereby these processes are optionally executed several times and by calcining at temperatures of 500°–700° C. and then developing the active phase, by proceeding as describing above. At the same time, it is preferred to use alkaline earth metal stabilized, especially calcium stabilized $Al_2O_3$.

Finally, the invention extends also to the use of the catalyst characterized previously as to substance and with regard to its production for the simultaneous elimination of carbon monoxides, hydrocarbons and nitric oxides from the exhaust gas of internal combustion engines with extensive shifting of the optimal point of operation of the catalyst in the direction toward the optimal operating point of a combustion engine with a mixture control by way of an oxygen probe.

The catalyst of the invention produces a series of surprising advantages. Thus, for one thing, it permits a shifting of the optimal catalyst operating point into the lean exhaust gas range, i.e., in the direction of the area of excess of air. From the publication entitled: "Exhaust Emissions of Motor Vehicles" by Professor Dr. Engineer Hans May, 1973, Publisher TÜV Rheinland GmbH, Cologne, it has been known that the minimal specific fuel consumption in this area is reached at lambda = 1.1. Whereas catalysts existing up to now with cerium and zirconium containing gamma-aluminum oxide carriers permitted operating points only in the area of λ=0.983-0.987, the catalyst according to the invention may be operated at operating points in the area of 0.998-1.005. The shift by λ=0.015 toward the lean area achieved by the synergistic cooperation of the elements cerium, zirconium and iron with the active phase makes it possible to reduce the discrepancy between the optimal operating points of the catalyst and oxygen probe and thus to improve the treatment mixture.

By this shifting of the $CO/NO_x$ crossover point toward the lean exhaust gas range, the engine may be operated with a lean adjustment which leads to considerable savings of fuel.

Whenever the catalyst is acted upon with a lean exhaust gas, it moreover gives a better light off as a result of which particularly the critical emissions in the starting and warming up phase of the engine are reduced.

The new catalysts furthermore show an improved degree of conversion of the harmful substances and broaden greatly their operational range, the so-called lambda window A/F-window. By suitable synchronization of the quantities used of cerium, zirconium and iron, the most favorable operating point of the catalyst may be synchronized with the pertinent optimal operating mode of an internal combustion engine.

Furthermore, the catalyst of the invention have a better conversion as a function of the exhaust gas temperature. This means that their light off temperatures are lower.

Finally, in the case of use of the catalysts according to the invention, better developed probe signals may be obtained in an electronic regulating system operating in the exhaust stream with oxygen analysis probe and developed as a "closed loop-system", for the following reasons: In the case of operation of $CeO_2$ and $ZrO_2$ catalysts containing "active aluminum oxide" in the carrier material, in the required range of λ=0.983-0.987, the oxygen measuring probe is acted upon with a rich exhuast gas. As shall be shown, as a result of that the probe signal is adulterated thereby, which is taken before the catalyst and is influenced by the hydrogen and the CO contained in the exhaust gas. This probe signal is not fully marked as compared to a probe signal which is taken after the catalyst and which may be designated as normally marked. As a result of that, the probe voltage skips the regulating range of the system which leads to a swinging over of the mixture formation and thus to an increase of the emission.

The use of the catalysts according to the invention makes it possible to operate the motor in a leaner manner; i.e. in the range of λ=0.998-1.005. In this area, the probe signal has been developed far better as a result of which the entire regulation operates more precisely which, in turn, leads to an admission of the catalyst with an exhaust gas composition which permits an optimal conversion and a further reduction of the emissions.

The invention will be explained in more detail subsequently on the basis of embodiments given by way of example and in connection with the drawings.

DETAILED EXAMPLES OF THE INVENTION

Example 1 (Comparative Example)

A structural honeycomb shaped reinforcer of cordierite was flushed through several times with a 30% aqueous dispersion of gamma-aluminum oxide, was dried between the individual flushing processes and was thereby coated with 180 g of $AL_2O_3$. Following that, there was a drying at 120° C. and then a tempering at 900° C. After cooling off, the cordierite honeycomb coated with the carrier material was treated in such a way with aqueous solutions of cerium and zirconium nitrate, that after the drying and the tempering at 700° C. for 60 minutes, 7.5 g of cerium oxide and 10 g of zirconium oxide remained in the $Al_2O_3$ coating. After that, the coated reinforcer was submerged into a combined aqueous solution of hexachloroplatinum acid/rhodium chloride and aluminum nitrate and was dried. The total noble metal content after this treatment amounted to 2.16 g of noble metal at a ratio of Pt/Rh=5:1 and the aluminum content was 1.08 g, corresponding to a weight ratio of noble metal to base metal of 2:1. Finally, the reduction of the noble metal salts precipitated on the carrier material took place in the hydrogen stream at a temperature of 500° C. for a duration of 1 hour. The specific BET surface of the catalyst produced in such a way was 15-20 $m^2/g$.

Example 2 (Catalyst according to the Invention)

A honeycomb shaped, structural reinforcer made of cordierite is coated as in example 1 with 180 g of gamma-aluminum oxide, is dried at 120° C. and is tempered at 500° C. Instead of standard aluminum oxide, an aluminum oxide was used which by the addition of calcium ions, had obtained an additional stabilization.

The sample unit prepared thus was then treated with an aqueous solution of cerium acetate, zirconium acetate and iron nitrate, in such a way that after drying and tempering at 700° C. for 60 minutes, 6.6% cerium oxide, 6.6% zirconium oxide and 6.6% iron oxide, based on the weight of aluminum oxide used, remained in the reinforcer coating.

The impregnation of the carrier material with noble metal (Pt/Rh) and aluminum took place as described in example 1, so that again 2.16 of noble metal were present in a ratio of Pt/Rh=5:1 and 1.08 g of aluminum corresponding to a weight ratio of noble metal to base metal as 2:1 were present as an active phase. The specific BET surface of the catalyst produced in this way was 18-24 m²/g.

Additionally, three samples of the catalyst according to the invention were produced according to the same process and with the same distribution of noble metal and base metal as described above. Merely the composition of the oxide layer functioning as the active phase was varied as follows:

(a) 4.2% $CeO_2$, 5.6% ZrO, 1% $Fe_2O_3$
(b) 4.2% $CeO_2$, 5.6% ZrO, 2% $Fe_2O_3$
(c) 4.2% $CeO_2$, 5.6% ZrO, 4% $Fe_2O_3$.

All amounts are in weight % related to the amount of aluminum oxide.

Example 3

Figure 1:
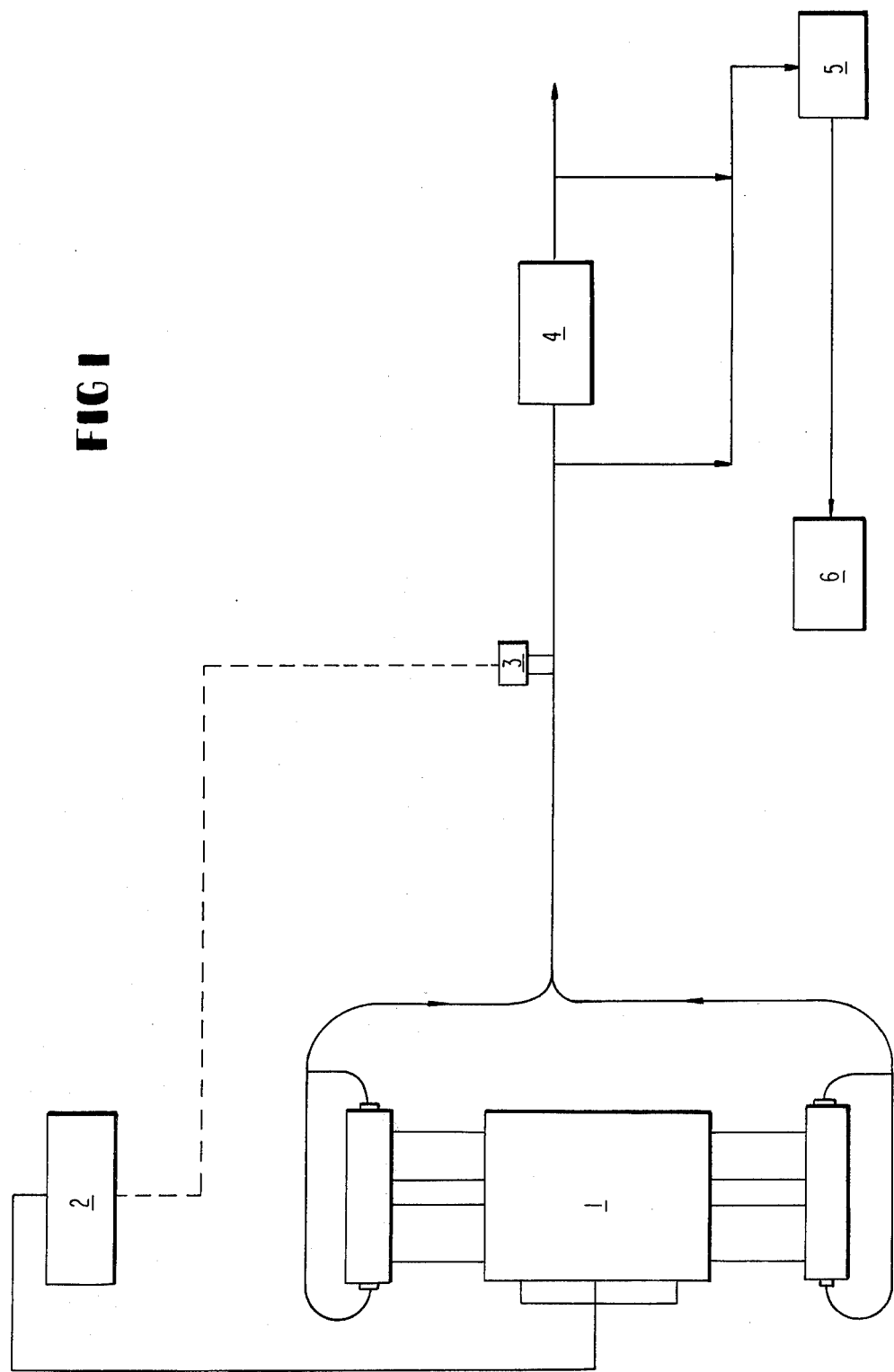
FIG. 1 shows the arrangement used for testing the technical application of the catalyst according to the invention in which (1) represents the motor, the preparation of the mixture of which is controlled by the regulating unit (2). The regulating unit (2) obtains its control signals from the oxygen probe (3), which is disposed in the stream of the exhaust gas of the engine. The exhaust gases then flow through the catalyst-test chamber (4), whereby samples may be drawn off before and after this chamber, which samples are then fed to the analyzing devices (5). The results are recorded on the recorder (6)

The catalysts produced according to examples 1 and 2 were checked in the exhaust stream of an Otto engine with the arrangement according to FIG. 1 for their function as three-way catalysts. The test parameters were as follows:

| | |
|---|---|
| 4 cylinder fuel injection motor with | Bosch K-Jetronic |
| dynamic test: | frequency 1 HZ |
| λ - fluctuation width: | ± 0.068 |
| exhaust gas temperature: | 450° C. |
| space velocity: | 75,000 h$^{-1}$ |
| catalyst aging: | engine 150 h |
| λ - test range: | 0.975-1.008 |

The following exhaust gas composition was measured before the catalyst:

| | |
|---|---|
| CO | 3-1.5% by volume |
| HC | 380-300 ppm |
| $NO_x$ | 2400-1700 ppm |
| $O_2$ | 1.7% by volume |
| $CO_2$ | 10-12% by volume |

The results of these investigations with the catalysts according to the invention are contained in Table 1 together with those of the comparative catalyst.

TABLE 1

Conversion = f (λ)
Mean Value Always of 2 Samples

| Catalyst as in Example | Crossover Point CO/$NO_x$ % | HC % | Crossover Point at Lambda | Lamda Window CO/$NO_x$ in case of HC conversion | | |
|---|---|---|---|---|---|---|
| | | | | 80% | 85% | 90% |
| 1 | 87.5 | 91 | 0.983 | 0.032 | 0.011 | — |
| 2a | 86.5 | 89 | 0.988 | 0.033 | 0.015 | — |
| 2b | 91.0 | 89 | 0.995 | 0.036 | 0.021 | — |
| 2c | 92.5 | 89 | 0.9975 | 0.044 | 0.024 | 0.008 |
| 2 | 94.0 | 87 | 0.998 | 0.046 | 0.032 | 0.016 |

Figure 2:
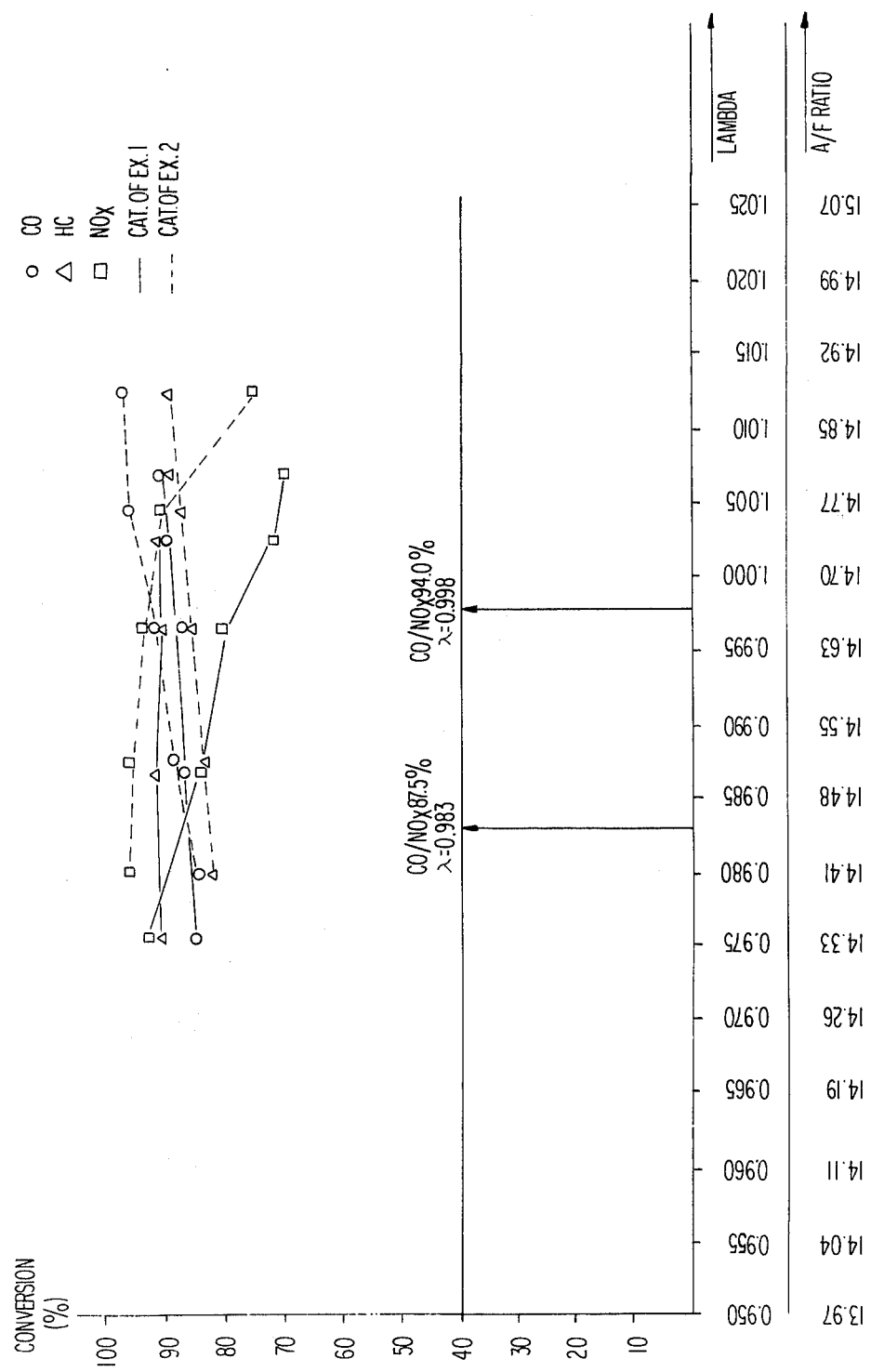
FIG. 2 shows the dependence of the degree of conversion on the air/fuel ratio A/F.

By the addition of iron oxide together with cerium oxide and zirconium oxide to the aluminum oxide, the dynamic function of the catalyst according to the invention changes considerably in comparison to catalysts containing only cerium/zirconium oxide:

(A) in FIG. 2, the CO, HC and $NO_x$ conversions of the catalysts produced according to example 1 or example 2 as a function of the air/fuel ratio, are shown. The crossover point of the CO/$NO_x$ conversion curves in the case of the catalyst of the invention has been shifted toward the lean range by Δλ=0.015, which makes possible a leaner operating mode of the system engine/catalyst and as a result leads to clearly lower fuel consumption. Whenever however, the catalyst is admitted with a lean exhaust gas, then it starts up better, as a result of which especially the very critical emissions at the beginning of the start-up of the engine are reduced.

A further advantage of the catalysts according to the invention, as can be seen from Table 1 and FIG. 2, is the higher degree of conversion of CO and $NO_x$, which leads to a further reduction of the impact on the environment.

Figure 3:
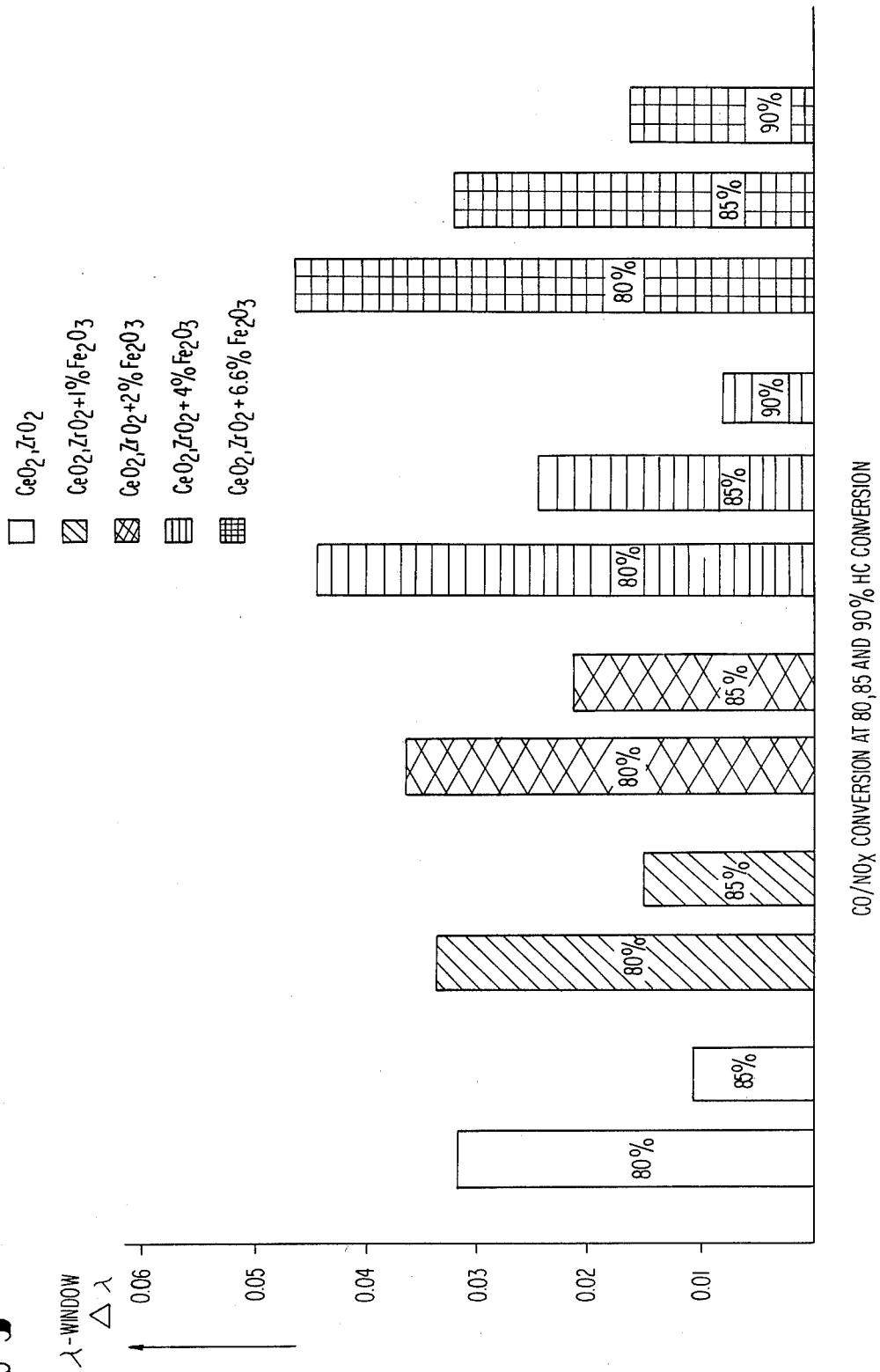
FIG. 3 shows the obtainable λ-window width in the case of certain catalyst compositions; obtainable with reference to an 80%, 85% and 90% conversion of CO and $NO_x$.

(B) From FIG. 3, it becomes clear how the lambda width of the window may be varied or widened by certain compositions of the catalyst according to the invention. The lambda window shows the CO- and $NO_x$-conversions at a certain degree of conversion of the hydrocarbons and thus is a measure for the width of the range of use of a catalyst. In the case of a rising content of the catalyst of the invention of the iron oxide component, the lambda window is widened considerably as compared to the comparative catalyst.

Figure 4:
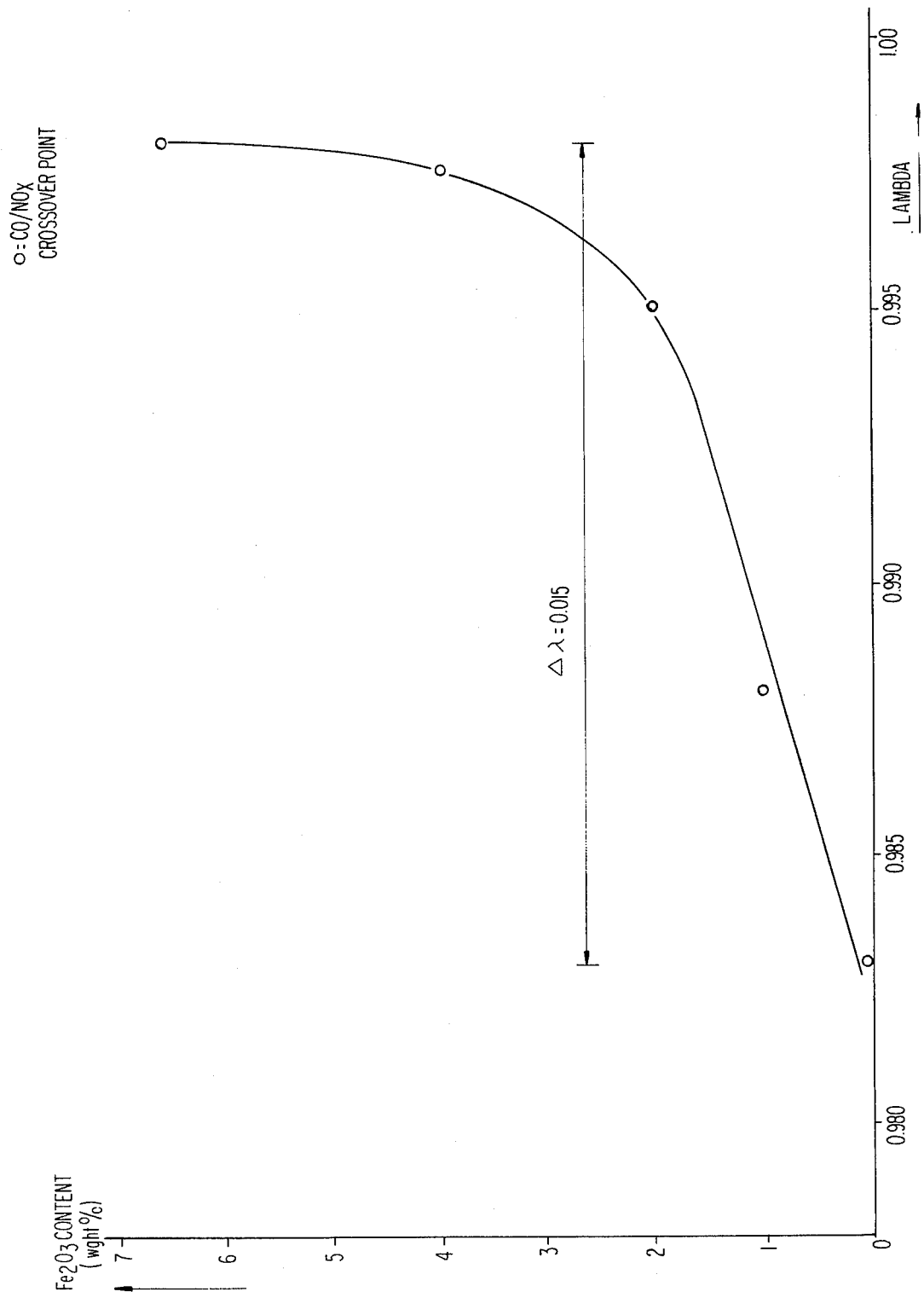
FIG. 4 shows the shifting of the optimal catalyst operating point into the lean area in dependence on certain catalyst compositions.

(C) FIG. 4 shows the shifting of the optimal catalyst operating point toward the lean area in dependence on certain catalyst compositions according to the invention. As it becomes clear from the curve, an optimum of the shifting is achievable in case of a content of the iron oxide component of 2-6%. related to the aluminum oxide used.

Figure 5:
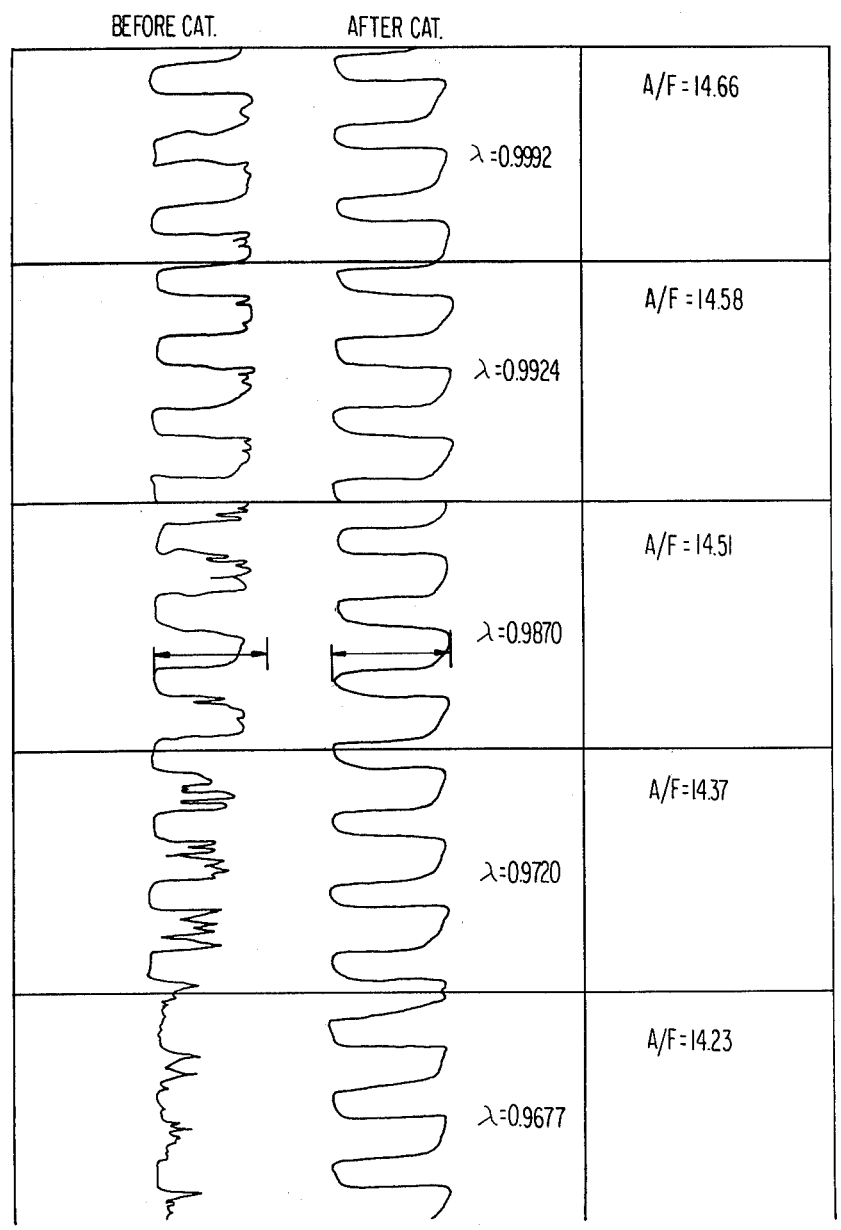
FIG. 5 shows the oxygen measuring probe signal before and after a three-way catalyst in the case of a rich air/fuel ratio of λ=0.9677-0.9992
Figure 6:
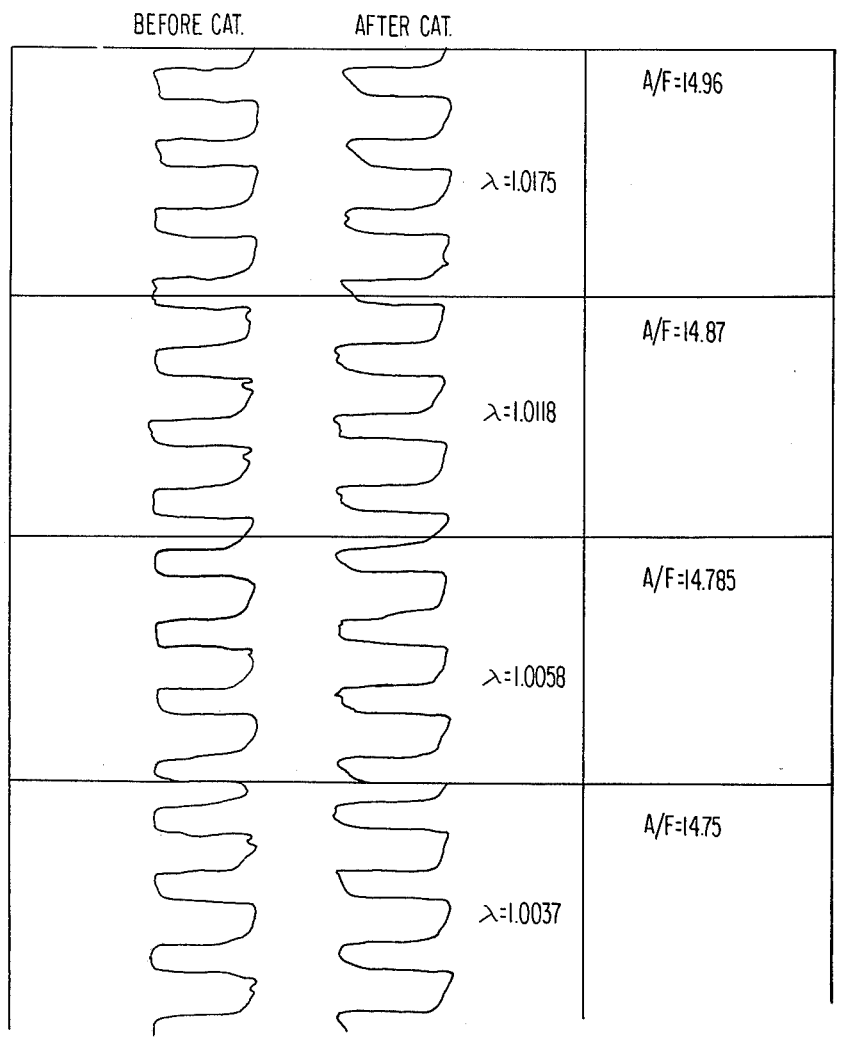
FIG. 6 shows the oxygen measuring probe signal before and after a three-way catalyst in case of a lean air/fuel ratio of λ=1.0037-1.0175.

In the case of the operation of the comparative catalyst (Example 1) in the area λ=0.983-0.987, required for the achievement of satisfactory conversions, the oxygen measuring probe 3 in FIG. 1 is acted upon with a rich exhaust gas. As can be seen from FIG. 5, the probe signal is falsified as a result of it. FIGS. 5 and 6 show a probe signal before and after a catalyst on which the hydrogen contained in the exhaust gas and a part of the carbon monoxide are converted; these harmful substances influence the probe signal. In comparison to the probe signal after the catalyst which may be designated as normal, the probe signal before the catalyst in FIG. 5 has not been fully marked in the catalyst regulating range. As a result of that, the probe voltage skips the regulating range of the system which leads to the overshooting of the mixture formation and thus to an increase of the emissions.

In the case of the use of the catalyst produced according to the invention, it is possible to operate the engine more leanly (λ=0.998-1.005). In this range, the probe signal as can be seen from the FIGS. 5 and 6, is far better developed. As a result, the entire regulating system operates more precisely and the catalyst is admitted with the exhuast gas composition which is required for an optimal conversion. Thus, the emissions are further reduced.

(D) As a result of the dimensioning of the three additional elements by quantity as provided, to the carrier material of the catalyst according to the invention, there exists the possibility of synchronizing the most favorable operating point of the catalyst always to the optimal operating method of the engine.

Example 4

(A) The catalysts produced according to the Examples 1 and 2 were investigated in the exhaust stream of an Otto engine for their conversion efficiency depending on the exhaust gas temperature. The test parameters were as follows:

| | |
|---|---|
| 4 cylinder fuel injection engine with Bosch K-Jetronic $\lambda$ = 1.0026 | |
| exhaust gas temperature: | 200°–450° C. |
| space velocity: | 75,000 h$^{-1}$ |
| aging of the catalyst: | engine 150 h $\lambda$ about 0.995 |

Before contact with the catalyst, the following exhaust gas composition was measured:

| | |
|---|---|
| CO | 0.45 by volume |
| HC | 260 ppm |
| NO$_x$ | 3000 ppm |
| O$_2$ | 0.46% by volume |
| CO$_2$ | 15.0% by volume |

As becomes clear from Table II, the light off temperature, that is to say that temperature at which a 50% conversion is achieved, is reduced in all three components of harmful substances.

TABLE II

Conversion = f (exhaust gas temperature)
Mean value from 2 samples

| Catalyst acc. to Example | CO 50% | CO 90% | HC 50% | HC 70% | NO$_x$ 50% | NO$_x$ 90% | CO* max. | CO* max. | CO* max. |
|---|---|---|---|---|---|---|---|---|---|
| 1 | 328 | 368 | 337 | 349 | 337 | 385 | 97.8 | 94.8 | 94.5 |
| 2a | 325 | 361 | 336 | 344 | 335 | 390 | 97.8 | 93.1 | 93.1 |
| 2b | 321 | 367 | 335 | 343 | 329 | 384 | 96.7 | 92.3 | 95.5 |
| 2c | 321 | 372 | 334 | 341 | 329 | 382 | 95.6 | 92.1 | 96 |

*450° C. exhaust gas temperature (B) A catalyst produced according to Example 2 was investigated in the exhaust stream of an Otto motor for its conversion efficiency in dependence on the exhaust gas temperature in the case of various air/fuel ratios. The test parameters were as follows:

| | |
|---|---|
| 4-cylinder fuel injection engine with Bosch K-Jetronic $\lambda$ = 0.9826; 0.9930; 1.0024 | |
| exhaust gas temperatures: | 200°–450° C. |
| space velocity: | 75,000 h$^{-1}$ |
| catalyst aging: | engine 150 h, $\lambda$ = about 0.995 |

The following exhaust gas compositions were measured before the catalyst:

| | $\lambda$ = 0.9826 | $\lambda$ = 0.9930 | $\lambda$ = 1.0024 |
|---|---|---|---|
| CO % by volume | 0.92 | 0.67 | 0.46 |
| HC ppm | 269 | 245 | 265 |
| NO$_x$ ppm | 2370 | 2430 | 2990 |
| O$_2$ % by volume | 0.36 | 0.40 | 0.46 |
| CO$_2$ % by volume | 14.75 | 14.95 | 15.0 |

This example clarifies as to how the light off temperatures for CO and HC of the catalyst result in lower values through shifting of the air/fuel ratio into the lean range, since more oxygen is available for the conversion. The results of this test sequence are summarized in Table III.

TABLE III

Conversion = f (Exhaust Gas Temperature at different $\lambda$-values)

| Catalyst acc. to Example | $\lambda$ | CO 50% | CO 90% | HC 50% | HC 70% | CO* max. | CO* max. |
|---|---|---|---|---|---|---|---|
| 2 | 0.9826 | 342 | 374 | 350 | 359 | 97.6 | 91.0 |
| 2 | 0.9930 | 332 | 368 | 342 | 359 | 96.6 | 90.3 |
| 2 | 1.0024 | 325 | 367 | 340 | 359 | 95.5 | 88.2 |

*Exhaust gas temperature 450° C.

Example 5

One catalyst according to Example 1 (comparative catalyst) and one of Example 2 (catalyst according to the invention) were produced with the exception that, instead of the aluminum, nickel was present in the active phase in a weight ratio of 4:1. In their tendency, the test results were the same as described in the Examples 3 and 4.

Example 6

One structural, honeycomb shaped reinforcer made of a high temperature resistant, scale resistant metal alloy, containing iron, aluminum and chromium, was heated, for the creation of a surface favorable for anchoring, in an oxygen containing gas for 3 hours at 950° C. and was coated in the same sequence with catalyst material as in the Examples 1 and 2.

The reinforcer was coated with 180 g of active aluminum oxide which contained 4 g of cerium oxide and 6 g of zirconium oxide in the case of the comparative catalyst, and 4 g of cerium oxide, 6 g of zirconium oxide and 5.4 g of iron oxide in the case of the catalyst of the invention. The active phase was composed of 1.64 g of a noble metal in the ratio of Pt:Rh=5:1 and 0.85 of aluminum.

The test results on the engine test stand were the same as to their tendency as were obtained in the Examples 3 and 4.

Example 7

Two liters of carrier material as a molded bulk material formed from active aluminum oxide with a bulk weight of about 0.5 kg/l were divided into two parts. The one part was impregnated with a cerium/zirconium salt solution corresponding to a content of 4.7 g of cerium oxide and 13.3 g of zirconium oxide, the other according to the invention was impregnated with a Ce/Zr/Fe-salt solution corresponding to a content of 4.7 g of cerium oxide 13.3 g of zirconium oxide and 7.5 g of iron oxide.

After drying at 150° C. and after a 1-hour tempering at 700° C. of the bulk material treated thus, the application of the active phase to the bulk material was accomplished by bringing it into contact with an aqueous solution of hexachloroplatinum acid and rhodium-III-chloride with a ratio of Pt/Rh=10:1 in such a way that always 0.4 g of noble metal were contained in each part. After the drying at 150° C., the two catalysts were subjected to a 1-hour reductive treatment with hydrogen at 550° C. The test results with regard to their tendency were the same as described in the Examples 3 and 5.

Example 8

The production of the comparative catalyst and of the catalyst according to the invention was accomplished in accordance with the recipes of the Examples 1 and 2. The aluminum oxide precipitation however was reacted prior to application to the structural reinforcer with a mixture of the oxides of cerium, zirconium or cerium, zirconium and iron, so that the compositions listed in these examples were present with regard to their oxides after tempering at 700° C. This was then processed further as described in the Examples 1 and 2. The results according to tendency were the same as described in the Examples 3 and 4.

Example 9 (Comparative Example)

The production was accomplished as described in Example 1. Merely the ratio of Pt:Rh was varied over a wide range, all other weight and ratio data remained unchanged. The noble metal ratios were as follows:

| | | | |
|---|---|---|---|
| (a) | Pt:Rh | = | 2:1 |
| (b) | Pt:Rh | = | 5:1 |
| (c) | Pt:Rh | = | 11:1 |
| (d) | Pt:Rh | = | 19:1 |

The reduction of the noble metal salts precipitated on the carrier material was accomplished with forming gas (5% $H_2$/rest $N_2$) at a temperature of 600° C. for the duration of 1½ hours. The specific BET surface of the catalyst produced thus amounted to 15–20 $m^2/g$.

Example 10 (Catalyst according to the Invention)

The production was accomplished as described in Example 2c. Merely the ratio of Pt:Rh was varied over the same range as in Example 9. The weight and the other ratio data have remained the same as compared to Example 2c. The noble metal ratios were as follows:

| | | | |
|---|---|---|---|
| (a) | Pt:Rh | = | 2:1 |
| (b) | Pt:Rh | = | 5:1 |
| (c) | Pt:Rh | = | 11:1 |
| (d) | Pt:Rh | = | 19:1 |

The reduction of the noble metal salts precipitated on the carrier material was accomplished with forming gas at a temperature of 600° C. for the duration of 1½ hours. The specific BET surface of a catalyst produced thus was 18–24 $m^2/g$.

Example 11

The catalysts produced according to Examples 9 and 10 were tested in the exhaust gas stream of an Otto engine with the arrangement as described in FIG. 1 and were checked for their function as three-way catalysts. The test parameters were as follows:

| | |
|---|---|
| 4-cylinder fuel injection engine with Bosch K-jetronic | |
| dynamic test: | frequency 1 HZ, λ = 0.995 |
| λ-fluctuation width: | ± 0.068 |
| exhaust gas temperature: | 450° C. |
| space velocity: | 75,000 $h^{-1}$ |
| aging of catalyst: | engine 150 h |

Before contact with the catalyst, the following exhaust gas composition was found:

| | |
|---|---|
| CO | 2.55% by volume |
| HC | 335 ppm |
| $NO_x$ | 1820 ppm |
| $O_2$ | 1.82% by volume |
| $CO_2$ | 10.5% by volume |

The results of the investigations with the catalyst according to the invention of Example 10 are contained in Table IV together with the comparative catalyst of Example 9:

TABLE IV

| Catalyst acc. to example | Mean values of always 2 samples | | |
|---|---|---|---|
| | % CO | % HC | % $NO_x$ |
| 9 a | 94.0 | 89.3 | 90.9 |
| 10 a | 92.6 | 89.0 | 98.1 |
| 9 b | 87.5 | 89.3 | 78.3 |
| 10 b | 89.4 | 89.3 | 86.3 |
| 9 c | 84.7 | 84.6 | 67.5 |
| 10 c | 89.0 | 90.2 | 80.2 |
| 9 d | 80.5 | 84.1 | 56.5 |
| 10 d | 87.5 | 91.6 | 77.6 |

Again, it is confirmed here that the catalyst of the invention, as seen in Example 3, is far superior to the comparative catalyst, particularly in the $NO_x$ conversion, and even in the case of a Pt:Rh ratio of 19:1, it still produces useful $NO_x$ conversions.

Further variations of the invention will be apparent to a person having ordinary skill in the art after reading the foregoing. Such variations are intended to be included within the scope of the following claims.

What is claimed is:

1. A catalyst for simultaneous oxidation of carbon monoxide and hydrocarbons and reduction of nitric oxides in exhaust gases of internal combustion engines, comprising
    (a) 0.03–3% by weight of a platinum and rhodium containing active phase with a weight ratio between platinum and rhodium of 2:1-20:1;
    (b) 5–15% by weight of a mixture of $CeO_2$ and $ZrO_2$, whereby these oxides are at weight ratios of 20–80:80–20;
    (c) 1–10% by weight of $Fe_2O_3$ as well as
    (d) a residual quantity up to 100% by weight of aluminum oxide of the transition series and obtained by impregnating a carrier material of $Al_2O_3$ of the transition series, with an aqueous solution containing cerium, zirconium and iron salts or, mixing the carrier material with the respective oxides of cerium, zirconium and iron, tempering for 30–180 minutes in air at 500°–700° C. thereupon impregnating the carrier with an aqueous solution of a salt of platinum and a salt of rhodium, drying and subsequently treating in a gas current containing hydrogen at temperatures 250°–650° C.

2. A catalyst as defined in claim 1 wherein a coating comprising the components (a)–(d) is present on a honeycomb-shaped structural support made of ceramic or metal in a quantity of 5–30% by weight, related to the weight of the structural support.

3. A catalyst as defined in claim 1 wherein the carrier material is present in the form of molded bulk material.

4. A catalyst as defined in claim 1 wherein a coating comprising the components (a)–(d) is present on structurally reinforcing bulk material bodies of ceramic or of metal.

5. A catalyst for simultaneous oxidation of carbon monoxide and hydrocarbons and reduction of nitric oxides in exhaust gases of internal combustion engines, comprising (a) 0.03–3% by weight of a platinum, rhodium and at least one of the base metal elements aluminum, titanium, tin, chromium, manganese, cobalt and nickel containing active phase with a weight ratio between platinum and rhodium of 2:1–20:1 and an atomic ratio between the platinum group metals and the base metals which may be present of 1:6–2:1.

(b) 5–15% by weight of a mixture of $CeO_2$ and $ZrO_2$, whereby these oxides are at weight ratios of 20–80:80–20;

(c) 1–10% by weight of $Fe_2O_3$ as well as (d) a residual quantity up to 100% by weight of aluminum oxide of the transition series and obtained by impregnating a carrier material of $Al_2O_3$ of the transition series optionally lattice stabilized with an alkaline earth metal, with an aqueous solution containing cerium, zirconium, and iron salts or mixing the carrier material with a mixture of oxides of cerium, zirconium and iron, tempering for 30–180 minutes in air at 500°–700° C. thereupon impregnating the carrier with an aqueous solution of a salt platinum, rhodium and at least one base metal component, drying and subsequently treating in a gas current containing hydrogen at temperatures of 250°–650° C.

6. A catalyst as defined in claim 5, wherein the base metal is aluminum or nickel, and platinum group metals and aluminum or nickel are present in a weight ratio of 3:1–1:1 or 4:1–2:1.

7. A catalyst as defined in claims 5 and 6 wherein a coating comprising the components (a)–(d) is present on a honeycomb-shaped structural reinforcer made of ceramic or matal in a quantity of 5–30% by weight, related to the weight of the structural reinforcer.

8. A catalyst as defined in claims 5 or 6, wherein the carrier material is present in the form of molded bulk material.

9. A catalyst as defined in claims 5 or 6, wherein a coating comprising the components (a)–(d) is present on structurally reinforcing bulk material bodies of ceramic or of metal.

10. A process for the production of the catalyst as defined in claim 1 comprising impregnating a carrier material of $Al_2O_3$ of the transition series, optionally lattice stabilized with an alkaline earth metal, with an aqueous solution comprising cerium, zirconium and iron salts or mixing with a mixture of their respective oxides, tempering for 30–180 minutes in air at 500°–700° C., thereupon impregnating the carrier with an aqueous solution comprising a salt of platinum, and rhodium thereafter drying the carrier and subsequently treating at temperatures of 250°–650° C. in a gas stream containing hydrogen.

11. A process as defined in claim 10, wherein the carrier material is tempered prior to impregnation with cerium-, zirconium- and iron salts or prior to the addition of the oxides of these elements, at 900° C.

12. A process as defined in claim 11 wherein the carrier material is saturated prior to tempering with an aqueous solution of an alkaline earth metal salt.

13. A process as defined in claims 10, wherein cerium nitrate, cerium acetate, ammonium cerium nitrate, cerium carbonate, cerium oxalate, cerium chloride or cerium citrate are used as the cerium salt; zirconium carbonate, zirconium acetate, zirconium nitrate, ammonium zirconium carbonate, zirconium oxychloride, zirconium formiate or zirconium propionate are used as the zirconium salt and in that iron formiate, iron nitrate, iron oxalate, iron thiocyanate, iron (II)-acetate, iron acetyl acetonate or ammonium iron citrate are used as iron salts.

14. A process for the production of the catalyst as defined in claim 5 comprising impregnating a carrier material of $Al_2O_3$ of the transition series, optionally lattice stabilized with an alkaline earth metal, with an aqueous solution comprising cerium, zirconium and iron salts or mixing with a mixture of their respective oxides, tempering for 30–180 minutes in the air at 500°–700° C., thereupon impregnating the carrier with an aqueous solution comprising a salt of platinum, rhodium and at least one of the base metal elements aluminum, titanium, tin, chromium, manganese, cobalt and nickel, thereafter drying the carrier and subsequently treating at temperatures of 250°–650° C. in a gas stream containing hydrogen.

15. A process as defined in claim 14 wherein aluminum or nickel is used as a base metal and platinum group metals and aluminum or nickel are used in a weight ratio of 3:1–1:1, or 4:1–2:1.

16. A process as defined in claim 14 wherein the carrier material is tempered prior to impregnation with cerium-, zirconium- and iron salt or prior to the addition of oxides of these elements at 900° C.

17. A process as defined in claim 16 wherein the carrier material is saturated prior to tempering with the aqueous solution of an alkaline earth metal salt.

18. A process as defined in claim 14 wherein cerium nitrate, cerium acetate, ammonium cerium nitrate, cerium carbonate, cerium oxalate, cerium chloride or cerium citrate are used as the cerium salt; zirconium carbonate, zirconium acetate, zirconium nitrate, ammonium zirconium carbonate, zirconium oxychloride, zirconium formiate or zirconium propionate are used as the zirconium salt and in that iron formiate, iron nitrate, iron oxalate, iron thiocyanate, iron (II)-acetate, iron acetyl acetonate or ammonium iron citrate are used as iron salts.

19. A process for as defined in claim 10, wherein the carrier material is first applied on the honeycomb shaped structural support of ceramic or metal or on the structurally reinforcing bulk material bodies by bringing these in contact with an aqueous dispersion of the carrier material in solution, after removal of excess dispersion, drying, calcining at temperatures of 900° C.

20. A process as defined in claim 14 wherein the carrier material is first applied on the honeycomb shaped structural support of ceramic or metal or on the structurally reinforcing bulk material bodies by bringing these in contact with an aqueous dispersion of the carrier material in solution, after removal of excess dispersion, drying, calcining at temperatures of 900° C.

21. A process as defined in claim 10 wherein the structural support is brought into contact with an aqueous dispersion of aluminum oxide of the transition series containing the salts of cerium, zirconium and iron in solution or the oxides of these elements, removing the excess dispersion, drying and calcinining at temperatures of 500° C.–700° C.

22. A process as in claim 21, wherein alkaline earth metal-stabilized $Al_2O_3$ is used.

23. A process as defined in claim 14 wherein the structural support is brought into contact with an aqueous dispersion of aluminum oxide of the transition series containing the salts of cerium, zirconium and iron in solution or the oxides of these elements, removing the excess dispersion, drying, calcining at temperatures of 500°–700° C.

24. A process as defined in claim 23 wherein alkaline earth metal-stabilized $Al_2O_3$ is used.

25. A catalyst as defined in claim 5, wherein said alkaline earth metal is calcium.

26. A process as defined in claim 12 wherein the alkaline earth metal salt is a calcium salt.

27. A process as defined in claim 17 wherein the alkaline earth metal salt is a calcium salt.

* * * * *